(12) United States Patent
Caillard et al.

(10) Patent No.: US 9,422,005 B2
(45) Date of Patent: Aug. 23, 2016

(54) CHASSIS OF A MOTOR VEHICLE OPTIMIZED FOR ABSORBING A FRONTAL IMPACT

(71) Applicant: RENAULT s.a.s., Boulogne Billancourt (FR)

(72) Inventors: Jerome Caillard, Gif sur Yvette (FR); Christian Delord, Pavillons sous Bois (FR); Herve Gaumont, Velizy (FR); Thierry Hlubina, Chaville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/390,510

(22) PCT Filed: Apr. 4, 2013

(86) PCT No.: PCT/FR2013/050745
§ 371 (c)(1),
(2) Date: Oct. 3, 2014

(87) PCT Pub. No.: WO2013/150246
PCT Pub. Date: Oct. 10, 2013

(65) Prior Publication Data
US 2015/0091329 A1    Apr. 2, 2015

(30) Foreign Application Priority Data

Apr. 5, 2012  (FR) ...................................... 12 53159

(51) Int. Cl.
*B62D 25/08* (2006.01)
*B62D 21/15* (2006.01)
*B60R 13/08* (2006.01)

(52) U.S. Cl.
CPC ............ *B62D 21/152* (2013.01); *B60R 13/083* (2013.01); *B62D 25/082* (2013.01)

(58) Field of Classification Search
CPC ...................................................... B62D 21/152
USPC ................ 296/203.01, 203.02, 187.09, 187.1
See application file for complete search history.

(56) References Cited

U.S. PATENT DOCUMENTS 5,125,715 A     6/1992  Kijima
5,868,457 A *   2/1999  Kitagawa .................. 296/187.09
(Continued)

FOREIGN PATENT DOCUMENTS

EP       0 421 277       4/1991
EP       2 186 712       5/2010
JP       2007 112260     5/2007

OTHER PUBLICATIONS

International Search Report Issued Jun. 14, 2013 in PCT/FR13/050745 Filed Apr. 4, 2013.
(Continued)

*Primary Examiner* — Dennis H Pedder
(74) *Attorney, Agent, or Firm* — Oblon, McClelland, Maier & Neustadt, L.L.P.

(57) ABSTRACT

A chassis of a motor vehicle optimized for absorbing a frontal impact. The chassis includes a firewall separating a passenger compartment of the vehicle from a front portion of the chassis configured to hold an engine, and a mechanism for absorbing a frontal impact including two side rails mounted on at least the front portion of the chassis and arranged on either side of the chassis, each side rail including a front portion and a rear portion assembled to overlap at least partially. The side rails are arranged such that an overlap area is below the plane of the firewall, and the rear portion of the side rail includes a material which is less compressible than the front portion of the side rail.

8 Claims, 2 Drawing Sheets

(56) References Cited

U.S. PATENT DOCUMENTS

| | | | |
|---|---|---|---|
| 7,188,893 B2 * | 3/2007 | Akasaka | B62D 21/152 296/187.08 |
| 2001/0033094 A1 * | 10/2001 | Sano et al. | 296/194 |
| 2003/0189358 A1 * | 10/2003 | Watanabe et al. | 296/203.02 |
| 2004/0183340 A1 | 9/2004 | Tomita | |
| 2004/0195862 A1 * | 10/2004 | Saeki | 296/187.09 |
| 2006/0170206 A1 | 8/2006 | Mitsui et al. | |
| 2010/0117403 A1 | 5/2010 | Kihara et al. | |
| 2012/0248820 A1 * | 10/2012 | Yasui et al. | 296/187.09 |

OTHER PUBLICATIONS

French Search Report Issued Feb. 6, 2013 in French Application No. 1253159 Filed Apr. 5, 2012.

* cited by examiner

CHASSIS OF A MOTOR VEHICLE OPTIMIZED FOR ABSORBING A FRONTAL IMPACT

BACKGROUND

The invention concerns the front part of a motor vehicle chassis, and more particularly the absorption of a frontal impact by the front side rail.

The energy that a motor vehicle receives in the event of a frontal impact is generally transmitted toward the rear of the vehicle with the aid of side rails distributed over the length of the chassis, and notably with the aid of front side rails.

To transmit the energy to the rear part of the chassis, the front side rails are coupled to the rest of the chassis, for example to central side rails mounted under the floor of the vehicle and to side members disposed at the periphery of the chassis.

The energy arising from the frontal impact is absorbed at different levels of the chassis. The chassis is configured to protect the passenger compartment as much as possible, that is to say so that it suffers virtually no deformation, in order to protect the persons inside. To this end the energy is absorbed by various elements of the chassis, notably by the front side rails. The front side rails are the primary means for absorbing energy. They absorb the energy generated by the frontal impact, generally by compression or even rotation of the side rail.

U.S. Pat. No. 6,908,146 describes front side rails of a motor vehicle chassis comprising a front portion and a rear portion welded together so as to overlap partially so as to increase the overall stiffness, the front side rails extending partly under a firewall separating the passenger compartment from the engine. The documents US 2010/0 117 403, U.S. Pat. No. 6,938,948 and U.S. Pat. No. 7,097,235 describe known chassis comprising a pair of side rails. The technical statistics described do not give the side rail section, routing and arrangement characteristics enabling good compressibility and good adaptation to absorbing energy in a compact environment.

SUMMARY

The invention proposes to alleviate these drawbacks with the aid of a chassis comprising front side rails configured to optimize the absorption and the transmission to the rear of the vehicle of a frontal impact, and to prevent intrusion of the engine compartment into the passenger compartment.

In accordance with one aspect of the invention, there is proposed in accordance with one embodiment a motor vehicle chassis comprising a firewall separating the passenger compartment of the vehicle from a front portion of the chassis intended to receive the engine, and means for absorbing a frontal impact including two side rails mounted at least on the front portion of the chassis and disposed on each side of the chassis, each side rail comprising a front part and a rear part assembled so as to overlap at least partially.

In accordance with one general feature, the side rails are disposed so that the overlap area is under the plane of the firewall, and the rear part of the side rail comprises a less compressible material than the front part of the side rail.

By positioning the area in which the front and rear parts of the side rails overlap under the plane of the firewall and by making the rear part of the side rails from a material more resistant to compression forces than the front part, the absorption area of the front side rail comprises the front part of the side rail and the rear part transmits the remaining energy to the rear of the chassis, whilst keeping the passenger compartment safe.

The front part of each side rail preferably comprises a front bend separating a planar front portion and a downwardly inclined rear portion, the front portion having a section smaller than the section of the rear portion.

The increasing section of the front part of the side rails in a direction from the front toward the rear makes it possible to increase the quantity of energy caused by a frontal impact that is absorbed and to optimize the compression of the planar portion.

The rear part of a side rail preferably comprises a rear bend separating a planar rear portion and a front portion inclined upwardly at an absorption angle relative to the rear portion of the rear part of the side rail, the absorption angle being strictly less than 30° (the smaller the better).

By maintaining a low absorption angle, the overhang and consequently the force on the side rail are reduced.

The front bend may advantageously comprise a rotation start point for absorbing energy by inward rotation of the side rail. The rotation start point is implemented in the front bend of the front part of the side rail at the level of the cup boss.

The overlap area preferably extends over an area of 50 mm between the front part and the rear part of the side rail.

The chassis may advantageously comprise a crossmember of the firewall disposed vertically in line with the overlap area, orthogonally to the front side rails. This crossmember enables force to be transferred to the transmission tunnel and makes it possible to maintain rotation of the rear part of the side rail about the vertical axis "z".

The chassis may also comprise a reinforcement in the front bend area of the front part of the side rail. This reinforcement makes it possible to prevent premature destruction of the side rail in the area of the bend (the area in which the stresses are concentrated).

BRIEF DESCRIPTION OF THE DRAWINGS

Other advantages and features of the invention will become apparent on reading the detailed description of one non-limiting embodiment and examining the appended drawings, in which.

DETAILED DESCRIPTION

Figure 1:
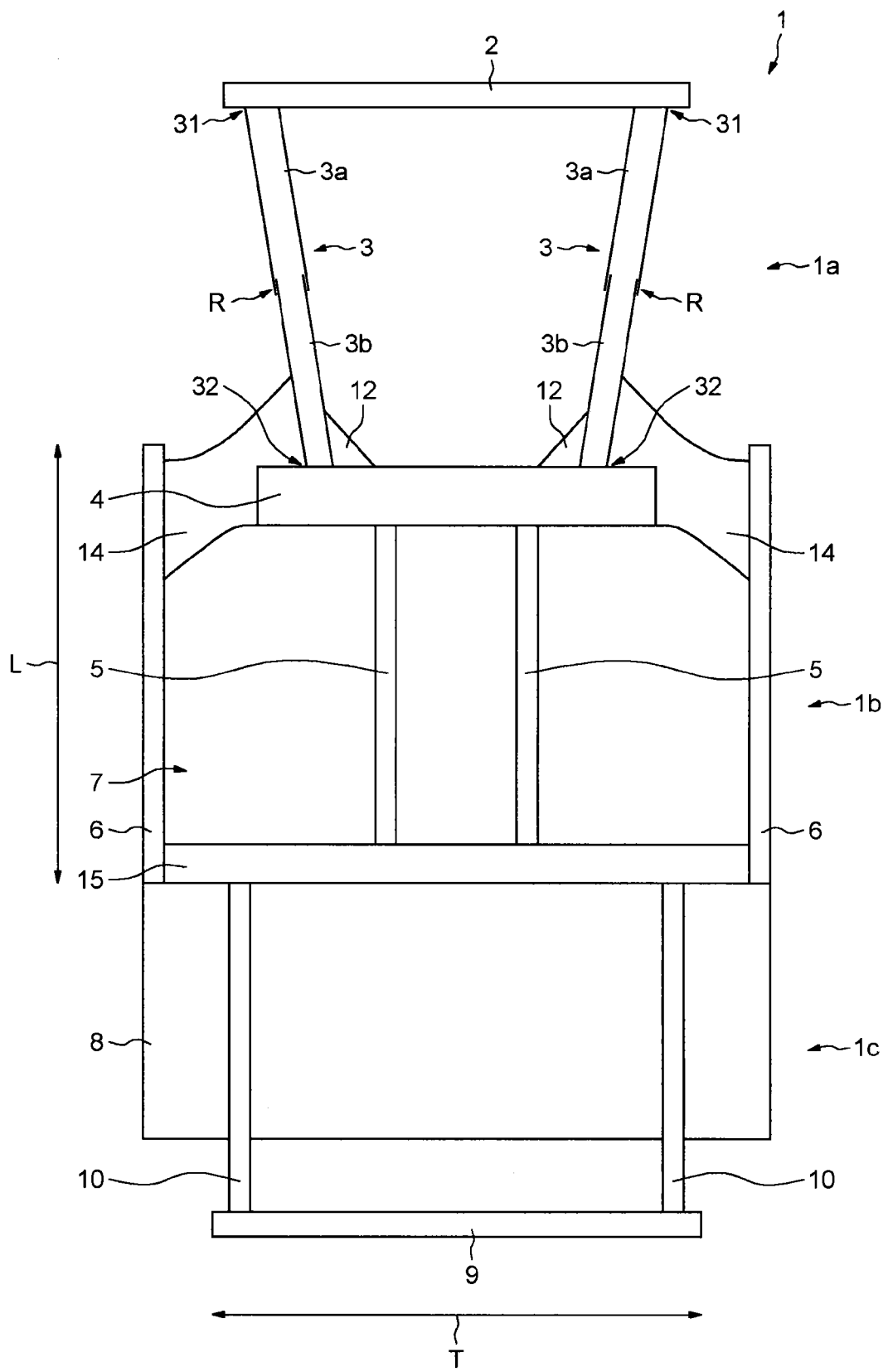
FIG. 1 shows diagrammatically a plan view of a motor vehicle chassis in accordance with one embodiment.

In FIG. 1 there is diagrammatically represented a plan view of a motor vehicle chassis 1 in accordance with one embodiment of the invention.

The chassis 1 comprises a front portion 1a including a front bumper 2, side rails 3 and a front crossmember 4, a central portion 1b including central side rails 5, side members 6 and a central floor 7, and a rear portion 1c notably including a trunk floor 8 and a rear bumper 9 coupled to rear side rails 10.

In the front portion 1a of the chassis 1, the front bumper 2 extends in a transverse direction T, i.e. orthogonally to the front/rear direction of the chassis 1, and is assembled with two side rails 3 extending in a longitudinal direction L, parallel to the front/rear direction of the chassis 1.

Each side rail 3 comprises a first end 31 to which the bumper 2 is fixed and a second end 32 to which is fixed the front crossmember 4 extending in the transverse direction T parallel to the bumper 2. The side rails 3 contribute to the stiffness of the chassis 1 and provide a support for engine and bodywork elements of the motor vehicle. They are also designed to contribute to the absorption of energy in the event of a frontal impact in particular. They enable transmission of the forces to which the front bumper 2 is subjected in the event of a frontal impact to the rear portion 1c of the chassis 1 and absorb some of the energy linked to these forces.

The side rails 3 are produced with a front part 3a fixed to the front bumper 2 and a rear part 3b fixed to the front crossmember 4. The front part 3a and the rear part 3b are assembled together so as to overlap partially in an overlap area R.

The front portion 1a of the chassis 1 also comprises two brackets 12 mounted between a side rail 3 and the crossmember 4 so as to stiffen the structure of the chassis 1. Each bracket 12 is assembled to a side rail 3 and the front crossmember 4 by means of fixing tongues that come to bear on the underside of the front crossmember 4 and on the underside of the side rail 3. The brackets 12 are also fixed by spot welds to the side rail 3 and to the front crossmember 4.

The chassis 1 also comprises two side crossmembers 14 each extending between a side rail 3 and a side member 6 extending in the longitudinal direction L at the periphery of the chassis 1 between the front portion 1a and the central portion 1b. Each side crossmember 14 is fixed to a side rail 3 at the height of the second end 32 by spot welds.

The side crossmembers 14 extend between the side rail 3 and the side member 6 in an oblique direction so that the portion of the side crossmember 14 coupled to the side member 6 is to the rear of the portion of the side crossmember coupled to the side rail 3. The resulting angle between the side rail 3 and the side crossmember is an obtuse angle.

The front portion 1a of the chassis 1 therefore comprises means for absorbing a frontal impact comprising a front bumper 2, side rails 3 coupled on the one hand to a crossmember 4 with brackets 12 and on the other hand to side crossmembers 14 coupled to side members 6.

The energy caused by a frontal impact on the front bumper 2 is therefore transmitted to the rear portion 1c of the chassis 1 on the one hand via the central side rails 5 coupled to the front crossmember 4 and to a rear crossmember 15 and passing under the central floor 7 and on the other hand via the side members 6 extending on each side of the chassis 1.

Figure 2:
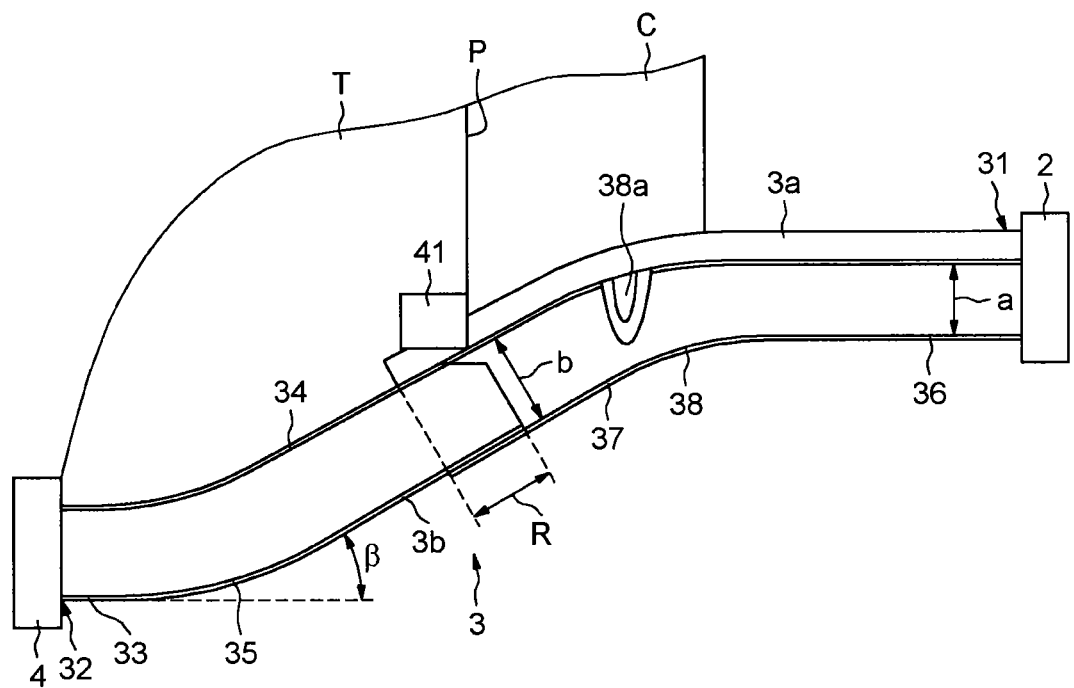
FIG. 2 gives a side view of a front side rail of the chassis from FIG. 1.

In FIG. 2 there is shown a detailed side view of a side rail 3 of the front part 1a of the chassis 1 from FIG. 1.

The rear part 3b of the side rail 3 comprises a planar rear portion 33 fixed to the front crossmember 4 via the end 32 and a front portion 34 inclined upwardly at an absorption angle β relative to the planar rear portion 33. The planar rear portion 33 and the inclined front portion 34 are separated by a rear bend 35.

The front part 3a of the side rail 3 comprises a planar front portion 36 coupled to the front bumper 2, and a downwardly inclined rear portion 37. The planar front portion 36 and the inclined rear portion 37 are separated by a rear bend 38.

The absorption angle β is strictly less than 30° (the smaller the better). The absorption angle β is kept low so as to obtain a smoother trajectory of the side rail 3 and so as to increase the quantity of energy absorbed by compression. Indeed, with a larger absorption angle, the compression of the side rail 3 is mainly localized at the front and rear bends 35 and 38, which enables less energy to be absorbed than with a smoother side rail trajectory that enables better distribution of the compression of the side rail, and notably of the front part 3a, over the whole of its length.

The planar front portion 36 of the front part 3a has a section having dimensions "a" smaller than the dimensions "b" of the section of the inclined rear portion 37 of the front part 3a. This section gradient toward the rear of the front part 3a of the side rail 3 makes it possible to increase the quantity of energy absorbed in the event of a frontal impact.

Moreover, the front bend 38 comprises a rotation start point 38a for absorbing some of the energy transmitted by the side rails 3 by inward rotation of the side rail 3, and notably by inward rotation of the front part 3a. The rotation start point 38a facilitates the compression by rotation of the side rail 3. It is disposed in the cup boss mask C.

The overlap area R is situated under the plane P of the firewall T and under a firewall crossmember 41 on which the firewall T rests. The rear part 3b is made from a relatively incompressible material, while the front part 3a is made from a compressible material. The overlap area R is therefore disposed at the level of the limit area of intrusion into the passenger compartment. The side rail 3 is configured to be compressed longitudinally and by rotation over a part in front of the plane P of the firewall T.

The planar front portion 36 of the front part 3a of the side rail 3 also includes an impact reinforcement (not represented) for increasing the quantity of energy absorbed by the front portion 36. The impact reinforcement may be pressed onto the bottom or the web of the side rail, for example, and this reinforcement may also have the engine cradle support function.

The invention therefore makes it possible to produce a chassis comprising front side rails configured to optimize the absorption and the transmission to the rear of the vehicle of a frontal impact and to prevent intrusion of the engine compartment into the passenger compartment.

The invention claimed is:

1. A motor vehicle chassis comprising:
a firewall separating a passenger compartment of a vehicle from a front portion of a chassis that is configured to receive an engine; and
means for absorbing a frontal impact including two side rails mounted at least on the front portion of the chassis and disposed on each side of the chassis, each side rail comprising a front part and a rear part assembled to overlap at least partially,
wherein the side rails are disposed so that an overlap area is under the plane of the firewall, and the rear part of the side rail comprises a less compressible material than the front part of the side rail, and
wherein a front bend includes a groove on an upper edge of the front bend that extends into the front bend, the groove is a rotation start point for absorbing energy by inward rotation of the side rail.

2. The chassis as claimed in claim 1, wherein the front bend separates a planar front portion and a downwardly inclined rear portion, the planar front portion having a cross-section smaller than a cross-section of the inclined rear portion.

3. The chassis as claimed in claim 1, wherein the rear part of a side rail comprises a rear bend separating a planar rear portion and a front portion inclined upwardly at an absorption angle relative to the rear portion of the rear part of the side rail, the absorption angle being strictly less than 30°.

4. The chassis as claimed in claim 1, wherein the overlap area extends over an area of 50 mm between the front part and the rear part of the side rail.

5. The chassis as claimed in claim 1, further comprising a crossmember of the firewall disposed vertically in line with the overlap area.

6. The chassis as claimed in claim 1, wherein the rear part of the two side rails are mounted to a front crossmember.

7. The chassis as claimed in claim 6, further comprising two central side rails coupled to the front crossmember and to a rear crossmember.

8. A motor vehicle chassis comprising:
- a firewall separating a passenger compartment of a vehicle from a front portion of a chassis that is configured to receive an engine; and
- two side rails mounted at least on the front portion of the chassis and disposed on each side of the chassis, each side rail comprising a front part and a rear part assembled to overlap at least partially,
- wherein the side rails are disposed so that an overlap area is under the plane of the firewall, and the rear part of the side rail comprises a less compressible material than the front part of the side rail, and
- wherein a front bend includes a groove on an upper edge of the front bend that extends into the front bend, the groove is a rotation start point for absorbing energy by inward rotation of the side rail.

\* \* \* \* \*